Figure 1:
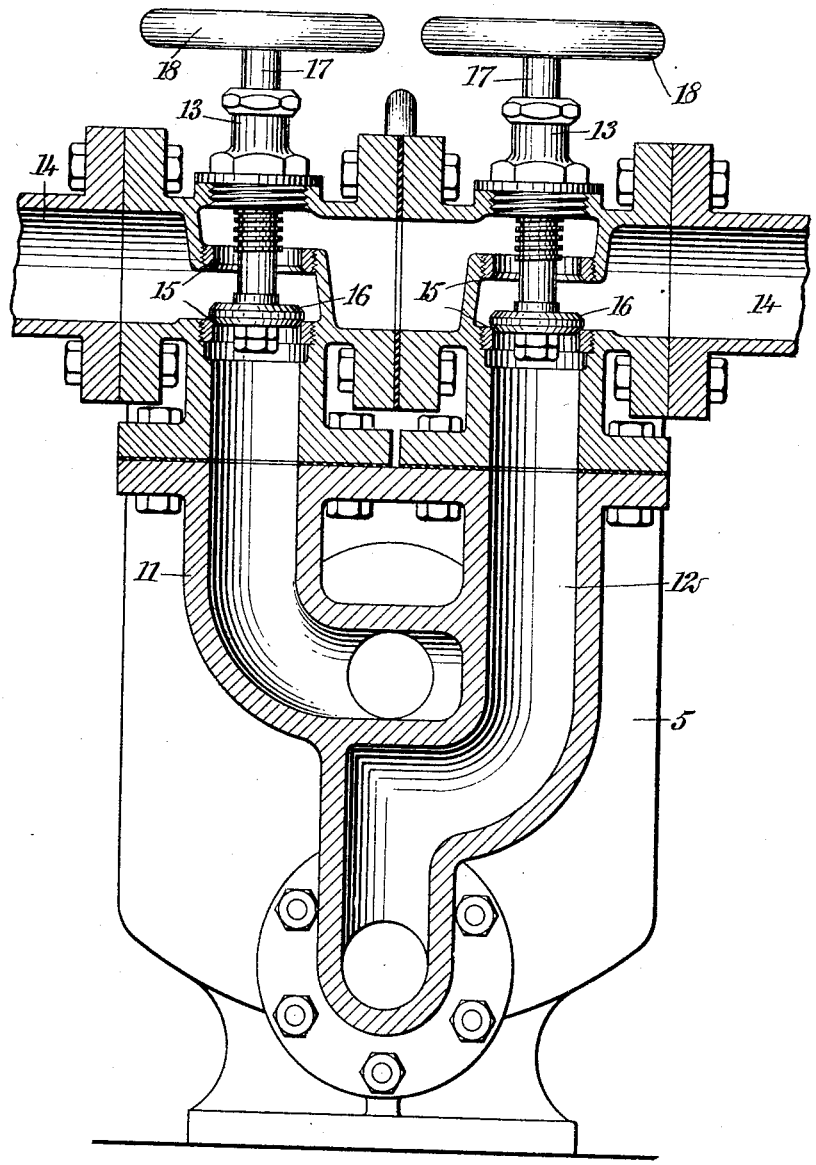

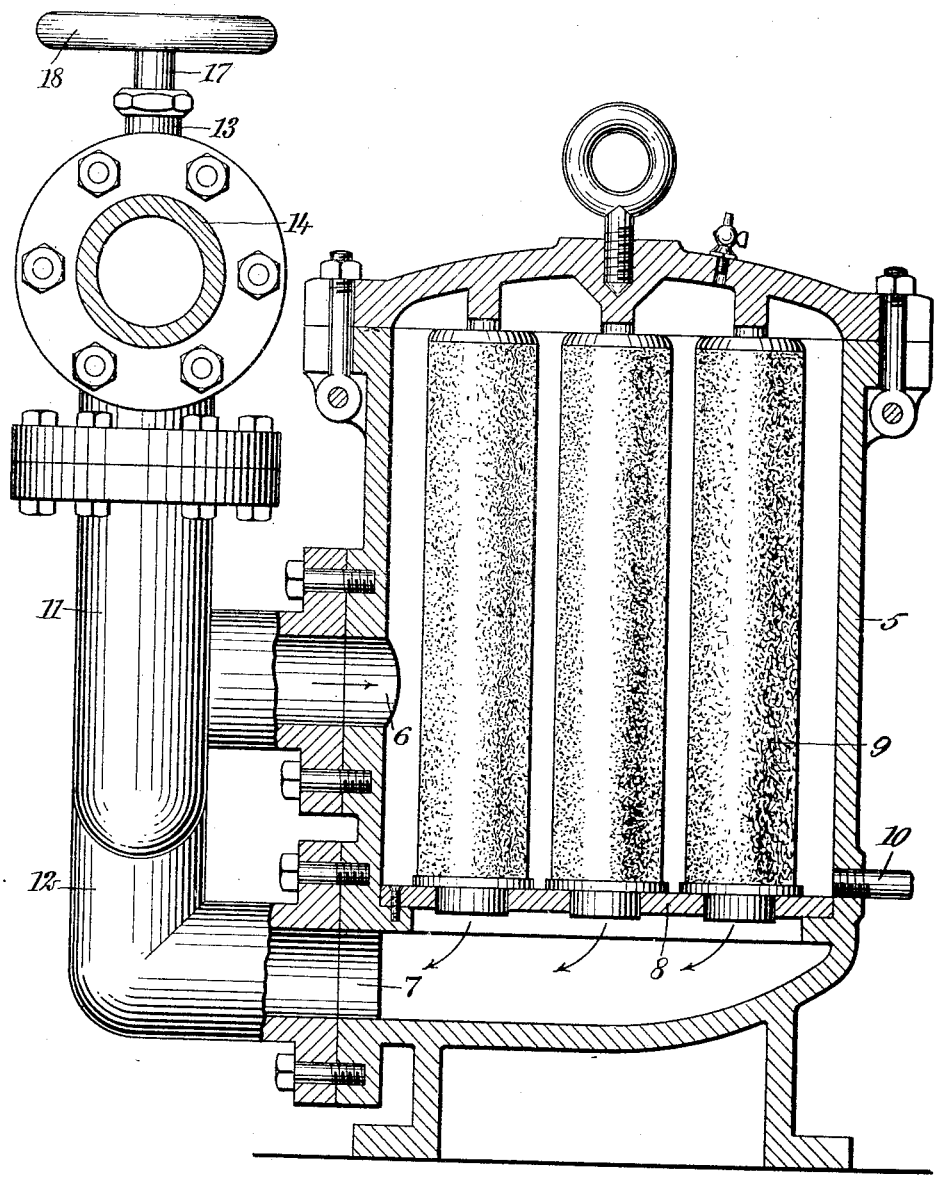

UNITED STATES PATENT OFFICE.

HENRY B. EELLS AND IRVIN H. KAUFMAN, OF NEW YORK, N. Y., ASSIGNORS TO JAMES BEGGS & CO., OF NEW YORK, N. Y., A CORPORATION OF NEW YORK.

FILTER CONNECTION.

1,108,153.   Specification of Letters Patent.   Patented Aug. 25, 1914.

Application filed December 5, 1908. Serial No. 466,043.

*To all whom it may concern:*

Be it known that we, HENRY B. EELLS and IRVIN H. KAUFMAN, citizens of the United States, and residents, respectively, of the city of New York, borough of Brooklyn, in the county of Kings and State of New York, and of the city of New York, borough of Manhattan, in the county and State of New York, have invented a new and Improved Filter Connection, of which the following is a full, clear, and exact description.

The main objects of the invention are to reduce the size and cost, and simplify the work of installation, control, repair and cleaning of filters and their connections.

The invention consists essentially in the combination of a filter with a detachable connection having special arrangements of passages and valve construction.

Reference is to be had to the accompanying drawings forming a part of this specification, in which similar characters of reference indicate corresponding parts in both views.

Figure 1 is a central vertical section through our improved filter connection, showing the valves in a position closing the inlet and outlet pipes of the filter casing, in which position the casing may be detached without interfering with the flow through the line pipe; and Fig. 2 is a central vertical section through the filter, taken at approximately right-angles to the section shown in Fig. 1.

For convenience of illustration we have shown our improvements in connection with a well-known type of filter, the same embodying in its construction a casing 5 having an inlet 6 and an outlet 7, separated one from the other within the casing by a wall 8, which supports, and through which passes, a number of upright filter cartridges 9. The filter is shown to be also provided with a wash-out pipe 10 in connection with the filter chamber, through which the collections on the filter cartridges are washed when the inlet is cut off and the flow is reversed through the outlet. In applying our improvements to this or other type of filter, we construct, preferably as a single piece and in the form of a Y, an inlet pipe 11 and an outlet pipe 12, the inner end of each pipe having a flanged collar which is bolted or otherwise detachably connected over the inlet and outlet connections of the filter casing. The arms of the Y inlet and outlet pipes are arranged upright, and are flanged to effect the connections with the main line pipe. This is accomplished by the use of two three-way valves 13, 13, which are detachably connected together, and likewise respectively connected to the inlet and outlet pipes and to the sections of the line pipe 14, of which they form a part. In making these connections, flanges and bolts are shown to be used in each instance, which in practice will ordinarily be the preferred manner of assembling.

The type of three-way valves employed have oppositely-arranged seats 15, 15, between which a valve head 16 is carried on a screw-threaded or other adjustable stem 17, the same being provided with any character of operating handle 18 at the outside of the valve casing. When passing the fluid through the filter, both valve heads are moved from the seats over the inlet and outlet pipes and seated on the opposite seats, which cut off direct communication between the valve casings and enforce the passage of the fluid through the filter. Should it be desired to disconnect the filter for any purpose, it is unnecessary to interfere with the flow through the line pipe, and as a result throw other filters out of operation, but a direct uninterrupted flow may take place through the valves, and the inlet and outlet pipes of the filter cut off by moving the valve-heads to the position shown in Fig. 1. This being done, the filter may be disconnected either by removing the bolts joining the valves and inlet and outlet pipes together, or the bolts between these pipes and the filter casing. By seating the valve-head over the inlet pipe and moving the other valve head to an intermediate position, the flow through the filter cartridges is reversed, and the collected matter thereon is carried out through the wash-out pipe 10.

Preferably the construction is so arranged as to have the passage through the supply pipe 14 and the valve casings horizontal and the passages 11 and 12 vertical. The upper of the valve seats 15, 15 are formed in partitions in the valve casings. As regards the direction of flow through the casings, the upper valve seats are located between the lower valve seats, that is, when the valves are down the fluid flows first over the left hand valve, then through the valve opening above it into the chamber formed between the valves and out through the upper valve opening at the right and over the valve below that. These arrangements we have found make the construction easy to set up and operate and keep in proper condition.

According to our invention it is possible to use the same filter body and valves for either a right or left flow of liquid. As shown herein the liquid flows to the right, but in case the flow in the main is from right to left and floor space is limited as it often is the intermediate part of the connection would simply have the passages 11 and 12 reversed. The same construction can also be used where the valves are to be accessible from below the filter instead of from above by simply inverting the connections. These features are important because it enables the manufacturer to comply with a variety of conditions with a few patterns. So also it becomes possible to shift the filter body from one side of the main to the other by simply putting in an intermediate part of the connection with reversely directed passages.

What we claim is:—

1. The combination with a filter having an inlet and an outlet, of a detachable supply pipe connection comprising two valve casings detachably secured to the filter and connected together, one casing having an inlet at one end and a passage at one side connected to the filter inlet and with a valve seat thereat and the other casing having an outlet at the opposite end and a passage at one side connected to the filter outlet and with a valve seat thereat, said casings having communicating chambers at their adjacent ends with a valve seat in each chamber opposite the before mentioned seats and a double seated valve in each casing adapted to co-act with the valve seats in its casing substantially as described.

2. In a filter construction the combination of a filter body having an inlet and an outlet, a pair of valve casings detachably secured together and having a main passage and lateral extensions therefrom, an intermediate member detachably secured to said body and to said valve casings and having passages connecting said extensions with the filter inlet and outlet, valve seats in said casings and valves coacting therewith for opening the filter to the main or opening the main past the filter.

3. The combination with a filter having an inlet and an outlet of a detachable connection comprising a body having a passage leading to the filter inlet and a second passage leading from the filter outlet, a pair of detachable casings having a main passage and a pair of valve seats in each casing, one seat of each pair being in the main passage and the other seats being opposite the first and at the mouths of the passages leading to and from the filter inlet and outlet respectively.

4. A detachable filter connection having a longitudinal main passage with two lateral extensions and a valve seat at the entrance to each extension and each extension also having one end turned substantially at right angles to the main passage and at right angles to the portions adjacent the main passage and valves coacting with said valve seats for the purpose specified.

5. In a filter construction the combination of a filter body having an inlet and an outlet, a removable cover for said body and a member for connecting the main supply pipe and the filter body independently of said cover, said member having valve seats located above the filter inlet and outlet and valves coöperating with said seats so that when both valves are "opened" the filter is in operation and all sediment will collect in the filter and when both valves are "closed" the filter is cut off and may be disconnected or opened and the passage through the main is open.

6. In a filter construction, the combination of a filter body having a filtering chamber with an inlet passage and an outlet passage in proximity to each other and a cover for permitting access to the filtering chamber, a main supply pipe line having lateral extensions in proximity to each other and valve seats therein, means for detachably securing the filter body to the main supply pipe line with the extensions in connection with the filter inlet and outlet respectively and valves coacting with said valve seats whereby the water can be permitted to flow through the filter or past the filter substantially as described.

In testimony whereof we have signed our names to this specification in the presence of two subscribing witnesses.

HENRY B. EELLS.
IRVIN H. KAUFMAN.

Witnesses:
EVERARD B. MARSHALL,
W. W. HOLT.

Copies of this patent may be obtained for five cents each, by addressing the "Commissioner of Patents, Washington, D. C."